July 15, 1930.                R. E. JONES                1,770,754
                         POULTRY FEEDING TROUGH
                          Filed March 21, 1928
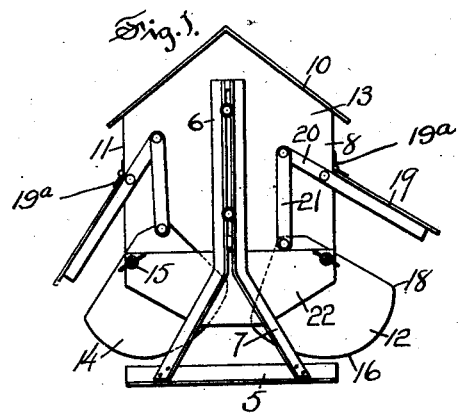
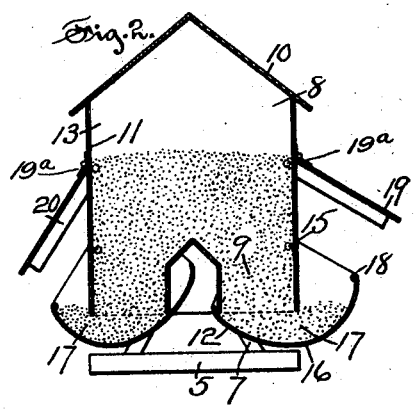
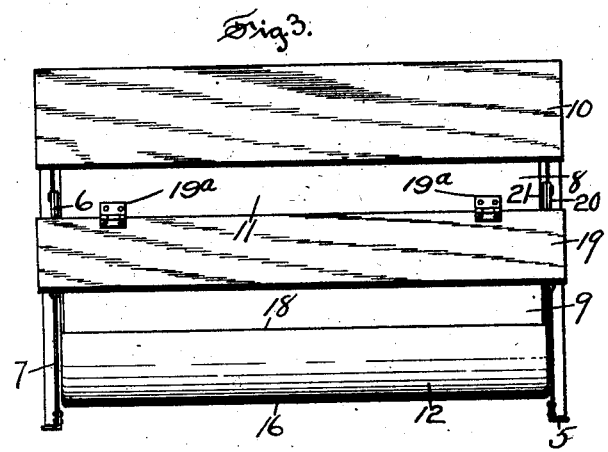
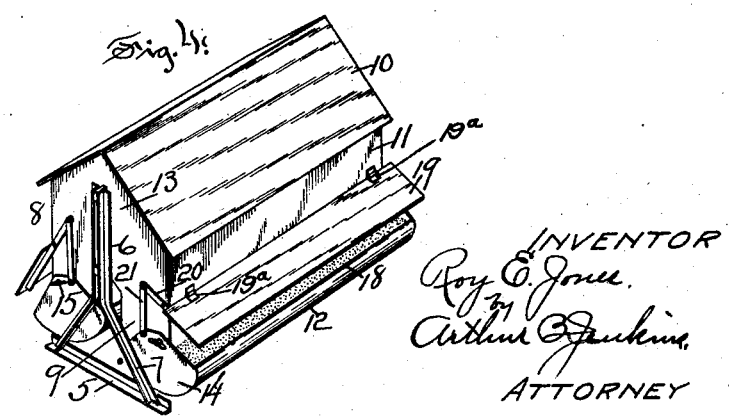
INVENTOR
Roy E. Jones.
By
Arthur B. Jenkins.
ATTORNEY Patented July 15, 1930

1,770,754

UNITED STATES PATENT OFFICE

ROY E. JONES, OF STORRS, CONNECTICUT

POULTRY FEEDING TROUGH

Application filed March 21, 1928. Serial No. 263,267.

My invention relates to the class of devices employed for storing and for supplying in proper amounts feeding material more especially for poultry, and an object of my invention, among others, is to provide a structure by means of which the necessary amounts of feed may be supplied and at the same time having means to prevent the fowls from wasting said feed by scattering it about; and a further object of the invention is to provide a structure that may be readily adjusted to suit the requirements as to chickens or fowls of different sizes.

One form of structure embodying my invention and in the construction and use of which the objects herein set out, as well as others, may be attained, is illustrated in the accompanying drawings, in which—

Figure 1 is an end view of my improved food trough.

Figure 2 is a view in cross section through the same.

Figure 3 is a view in front elevation, and

Figure 4 is an isometric view of the same, the shields being removed.

My improved device comprises a support located at each end of the structure, each support including a base 5 and an upright 6, the latter preferably comprising legs 7 secured at their lower ends to the base and inclined inwardly toward each other, the upright proper rising from said legs. These supports may be formed of any suitable material, angle iron having been found to satisfactorily answer the purpose.

A receptacle in the form of a house 8, is attached at its opposite ends to said supports and is adjustable vertically, as by means of bolts extending through slots formed by spacing the uprights a slight distance apart, and as shown in Figure 1 of the drawings. Chutes 9 open from the bottom of the house downwardly, said chutes extending from end to end of the structure, and being spaced apart at the back portions thereof, the bottom of the house being inclined in opposite directions into said chutes, as shown in Figure 2 of the drawings. A roof 10 preferably of A-shape is attached in any suitable manner to the end walls and to the front walls 11.

Troughs 12 are attached to the structure in position to underlie the openings at the bottom of the chutes 9, and as shown in Figure 2. These troughs are pivotally attached at their ends to the ends 13 of the house, the troughs being slightly longer than the house so that the chutes 9 will be received between end walls 14 of the troughs, said end walls, however, being located close enough to the ends of the house to afford substantially a sliding fit. It will be understood that a trough is provided for each of the chutes 9 and these troughs are pivoted at their opposite ends as at 15.

The bottoms 16 of the troughs are curved more or less irregularly but in such manner that openings 17 between the bottom of each trough and the lower front edge of the chute 9 will decrease in width as the trough is swung backwardly on its pivot, and as illustrated in Figure 2, in which it will be noted that said opening 17 at the left of the figure is narrower than the like opening 17 at the right of the figure, said trough at the left being swung farther back than the trough at the right.

When the troughs are swung forward to their farthest extent, as shown at the right in Figure 2 of the drawings, they will have the greatest width, thus accommodating fowls of larger size and the opening 17 will also be of its greatest width to correspond to the width of the trough. When, however, a trough is swung backwardly from this position its upper front edge 18 will be located nearer the ground, thus accommodating fowl of the smaller size, as chicks and the like, and correspondingly the opening 17 will be narrowed to correspond with the narrowed trough.

Hoods 19 are pivotally attached at their upper edges to the front walls 11 of the house by means of hinges 19$^a$, and as shown in Figures 1 and 3 of the drawings, these hoods being located underneath the eaves of the roof 10 and close enough to the mouths of the troughs to prevent the fowls or chicks from standing on the edges of the troughs, These hoods or covers rest upon arms 20 independently pivotally attached to the ends of the house and connected as by means of connecting rods 21 with the ends 14 of the troughs whereby the positions of the hoods may be governed by the positions of the troughs, the hoods or troughs being automatically swung on their pivots when either is moved to adjust it in proper position, said hoods also being susceptible of swinging movement independently of the arms 20.

Shields 22 are attached to the ends of the house 8 as by mounting said shields on the pivots 15. These shields are of a width and length to cover the openings between the chutes 9 and thus prevent the entrance of rain or snow into the back parts of the troughs between the chutes.

It will be seen that my improved feeding device provides a trough that may be readily adjusted as to width to accommodate fowls of different sizes and that the openings from the chutes into said trough will be automatically graduated as to width in proportion to the width of said troughs. Further than this means, as the hoods 19, are provided not only to cover the troughs and thus protect the contained grain from rain or the like, but it also prevents the fowls from standing upon the edges of the troughs or within the troughs. It also prevents wasting of the grain by the fowls, either when standing upon the edge of the trough or by throwing it out with their beaks. By hinging the hoods separately of the arms 20, as hereinbefore explained, they may be raised independently of the troughs as for the purpose of placing feed directly in the front of said troughs, for cleaning, or for any other desired purpose.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. A poultry feeding device with an opening at the bottom thereof, and a trough pivotally mounted to underlie said opening and having end walls between which the ends of said device are located, the bottom of the trough being curved across said opening and on lines to effect widening of the space between the lower edge of said opening and the bottom of the trough in proportion to the widening of the feeding opening to the trough in front of the device and vice-versa.

2. A poultry feeding device including a house with a chute projecting from the lower end thereof, a trough pivotally mounted on said chute and having end walls and a curved bottom, the lower end of the chute projecting into said trough, said bottom being curved to vary the width of the opening between the bottom edge of the chute and the bottom of the trough in proportion to the varying in width of the feeding opening in said trough as it is swung on its pivot.

3. A poultry feeding device including a house, chutes extending from end to end of the house at opposite sides thereof and spaced apart, said troughs having curved bottoms and end walls, said troughs being pivotally attached to said chutes and said chutes projecting into said troughs, the back edges of the troughs swinging into the space between the chutes when the troughs are swung backwardly and the bottoms of the troughs being curved on lines to vary the width of the space between the bottom edges of the chutes and the bottoms of the troughs in proportion to the varying of the width of the feeding openings of the troughs in front of the chutes.

4. A poultry feeding device including a house, standards secured at each end of the house, means for adjusting the position of the house vertically on the standards, and trough underlying an opening in the bottom of the house, said trough being pivotally mounted and having its bottom curved to provide a variation in the width of the opening between the bottom edge of the house and the bottom of the trough in proportion to the variation in the width of the feeding opening in front of the house.

5. A poultry feeding device including a house having an opening in the bottom thereof, a trough pivotally attached to the house to underlie said opening and to provide a space for feed in front of the house, a hood pivotally attached to the house overlying said trough, and a connection between said hood and said trough to effect simultaneous pivotal movement of both.

6. A poultry feeding device including a house having an opening in the bottom thereof, a trough pivotally attached to the house to underlie said opening and to provide a receptacle for feed in front of the house, a hood pivotally attached to the house overlying said trough, and means for swinging said hood with the trough but being inoperative to prevent independent movement of the hood.

7. A poultry feeding device including a house having a discharge opening, a trough pivotally attached to the house to receive feed from said opening, means pivotally attached to the house to overlie said trough, and a connection between said means and said trough to effect simultaneous pivotal movement of both.

8. A poultry feeding device including a house having an opening in the bottom thereof, a trough pivotally attached to the house to underlie said opening and to provide a space for feed in front of the house, a hood pivotally attached to the house to overlie said trough, and a connection between said hood and said trough to effect simultaneous pivotal movement of both, said connection including a pivoted arm operatively connected to the trough and underlying the hood but being unattached to the latter, whereby the hood may be moved upwardly away from the arm without affecting the position of the trough.

ROY E. JONES.